United States Patent
Schwab et al.

(10) Patent No.: US 8,463,675 B1
(45) Date of Patent: Jun. 11, 2013

(54) SYSTEM AND METHOD FOR OPERATING AN EXCHANGE TRADED FUND THAT MAKES DISTRIBUTIONS FROM SOURCES INCLUDING CAPITAL IN THE FUND TO PROVIDE A STABLE OR MINIMUM DISTRIBUTION

(75) Inventors: Charles R Schwab, San Francisco, CA (US); Walter W Bettinger, II, Menlo Park, CA (US); Randall W Merk, Menlo Park, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 163 days.

(21) Appl. No.: 12/798,934

(22) Filed: Apr. 13, 2010

(51) Int. Cl.
*G06Q 40/00* (2012.01)
(52) U.S. Cl.
USPC .......................................... 705/35; 705/36 R
(58) Field of Classification Search
USPC ..................................... 705/35–45
See application file for complete search history.

(56) References Cited

U.S. PATENT DOCUMENTS

| 7,739,186 B1 * | 6/2010 | Gerber | 705/37 |
| 2007/0112657 A1 * | 5/2007 | Huber | 705/35 |

OTHER PUBLICATIONS

Financial Post, Dec. 12, 2005, Barclays ETF.*

* cited by examiner

*Primary Examiner* — Richard C Weisberger
(74) *Attorney, Agent, or Firm* — Innovation Partners; Charles E. Gotlieb

(57) ABSTRACT

A system and method manages an ETF having shares traded on an exchange, having been provided by the ETF via an authorized participant. The ETF provides a distribution to such shareholders according to a set of distribution rules, which are published in advance. The distribution is paid using income derived from the capital assets of the ETF. If such income is insufficient to pay the distribution according to the rules, the capital assets of the ETF are used to pay the distribution to the shareholders to the extent that income is insufficient to pay the distribution according to the distribution rules.

7 Claims, 3 Drawing Sheets

SYSTEM AND METHOD FOR OPERATING AN EXCHANGE TRADED FUND THAT MAKES DISTRIBUTIONS FROM SOURCES INCLUDING CAPITAL IN THE FUND TO PROVIDE A STABLE OR MINIMUM DISTRIBUTION

FIELD OF THE INVENTION

The present invention is related to computer software and more specifically to computer software for implementing investment strategies.

BACKGROUND OF THE INVENTION

Exchange traded funds ("ETF"s) allow an investor to benefit from an investment strategy that the fund outlines to its investors and potential investors. ETFs are described in U.S. Pat. No. 7,444,300 entitled "Method and System for Improved Fund Investment and Trading Processes" issued to Broms et al on Oct. 28, 2008 and such patent is hereby incorporated by reference in its entirety.

An investor can select an exchange traded fund that corresponds to the investor's desired investment strategy. An ETF may track one or more indices (e.g. the S&P 500, etc) or utilize a mix of securities whose values are periodically maintained within certain percentage ranges of assets, and therefore be passively managed, may be actively managed, where the manager of the fund selects investments that meet an overall investment strategy, or may have both active and passive components, for example, tracking an index for 60% of the value of the fund, and investing in stocks.

An ETF may distribute funds to its investors. For example, conventional ETFs may distribute an amount equal to the earnings of the ETF at the end of every quarter. This could cause the distribution amounts to fluctuate, if, for example, the earnings of the ETF were to fluctuate on a quarter by quarter basis.

Some investors would prefer a more stable distribution, and ETFs can provide such a stable distribution. For example, U.S. Patent application 20070112657 entitled, "Exchange Traded Fund or the Like Related to Basket of Fixed Income Securities Having Similar Maturities" filed by John Huber on Oct. 3, 2006, describes the use of an ETF to purchase fixed income securities to diversify the risk of an investor who might otherwise purchase a single fixed income security. The fund buys fixed income securities, distributes the interest it receives, and then, when the fixed income securities have matured, distributes the principal and shuts down. This approach solves the problem of predictable income but may not provide the highest available returns for the risk taken, and it ends, requiring the investor to find another investment, which may not provide the return of the original.

Investors may have investment goals in addition to a stable distribution. For example, an investor may wish to receive a minimum distribution from an ETF, but have the opportunity to receive higher distributions than the minimum distribution will provide. Conventional ETFs have not provided such distributions.

What is needed is a system and method that can allow an ETF to supply its investors with either a predictable distribution, or a distribution that may meet other investment needs, while also providing the opportunity for the investors to earn more than such a distribution.

SUMMARY OF INVENTION

A system and method, on one or more first computer systems on a network (such as conventional stock exchanges), allows buyers and sellers to submit bids and asking prices for various securities, matches buyers and sellers and publishes statistics regarding bidding prices, asking prices, transaction prices and volumes in the manner of a conventional exchange. The securities may include ETF shares or securities purchased and sold by ETFs.

The system and method, on one or more second computer systems, performs additional activities now described. The system and method publishes an identified investment objective for an ETF which may include distribution rules (or such rules may be published separately. The investment objective may include amounts of securities to be held by the fund (e.g. 50% in a first index and 50% in a second index) or amounts of types of securities held by the fund. The system and method processes creations and redemptions of creation units to and from authorized participants, who purchase and sell shares of the ETF from and to its investors.

The processing of creations and redemptions may include publication of amounts of securities and/or cash that may be used for a creation or redemption, and may include purchasing and/or selling securities in exchange for cash. The ETF holds securities in amounts that correspond, at least at a point in time, to the investment objectives of the ETF, and those amounts may be the amounts published as described above. The manager of the ETF may rebalance the securities it holds at certain periods to bring the relative amounts of the securities back within specified percentages. The manager of the ETF may also purchase and sell securities for purposes other than rebalancing, or for the sale or redemption of creation units in the embodiments in which the ETF is actively managed, though other embodiments use only passive management of the ETF, for example, holding the securities of one or more indices.

The identity or types of securities, and the amounts of such securities held by the ETF are selected so that, over the long term, on average, the fund should be able to distribute to its investors at least a minimum amount or rate or return (e.g. as measured by the beginning net asset value of the fund) over time, and possibly more, from income (dividends, or dividends plus interest, etc.) earned from at least some of the securities held. The minimum amount may be fixed or guaranteed over a long period of time, subject only to a limitation of sufficient capital, so that a requisite level of stability is provided.

The fund provides at least a minimum distribution at the end of each of several distribution periods, but does not guarantee such a distribution will come solely from income, leaving a nonzero chance that the ETF will be required to use some of the capital (including capital appreciation) from the underlying holdings of the ETF (as opposed to selling more shares) in order to meet one or more minimum distributions according to the distribution rules. If the distribution can be satisfied from income, the income is used for the distribution. Otherwise, undistributed income of the ETF is used and then capital from the ETF is also used to meet the minimum distribution.

In one embodiment, capital is only used to make up any shortfall between the undistributed income and the minimum distribution. In one embodiment, not all income need be distributed when a distribution is made. In one embodiment, income may be used to replenish capital that was distributed, at which point the income will not be considered as income in computing one or more subsequent distributions.

The determination of which securities and how many to purchase and sell are made using the statistics obtained over the network from the first computer system (e.g. the exchange), and the purchase and sale of such securities may be made via commands sent via the network to the first computer system, which executes them as offers to trade, trades, or both. For example, to determine whether to rebalance the portfolio and the amounts of the securities to buy and sell to rebalance them, the current prices of the various component securities of the ETF may be used to determine if the ratio of values of the component securities to the total value of the capital in the ETF are within specified ranges, and if not, the prices from the exchange or exchanges may be used to determine the amount of the securities to buy and sell. The manager of the ETF (or another party on the manager's behalf) also publishes to one or more exchanges a Net Asset Value ("NAV") and frequently publishes an intra-day NAV of the ETF to indicate the amount of ETF capital assets and retained earnings being held per ETF share.

Distributions from the ETF may be made by, or on behalf of, the ETF manager to investors in the ETF specified by the exchange on which the shares of the ETF were purchased. The amounts of the distributions and/or minimum distribution amount or percentage or other calculation may be published by the manager of the ETF as part of the publication of the investment objectives, or it may be published separately. The distribution may be fixed, or may have a minimum, with a potential additional portion calculated according to a published formula, which may be a function of the income of the ETF.

Investors buy shares in the ETF from authorized participants or from other investors via markets at the price that may be based on, but different from, the NAV published by the manager of the ETF.

DETAILED DESCRIPTION OF A PREFERRED EMBODIMENT

Figure 1:
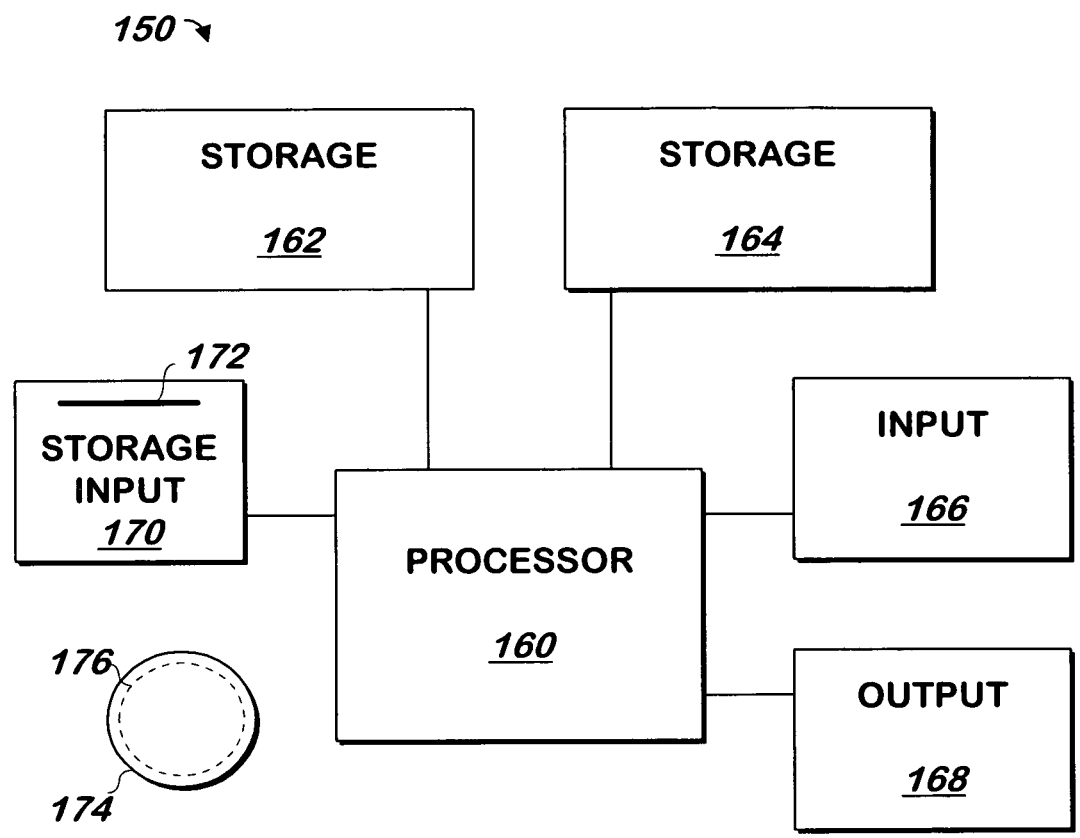
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
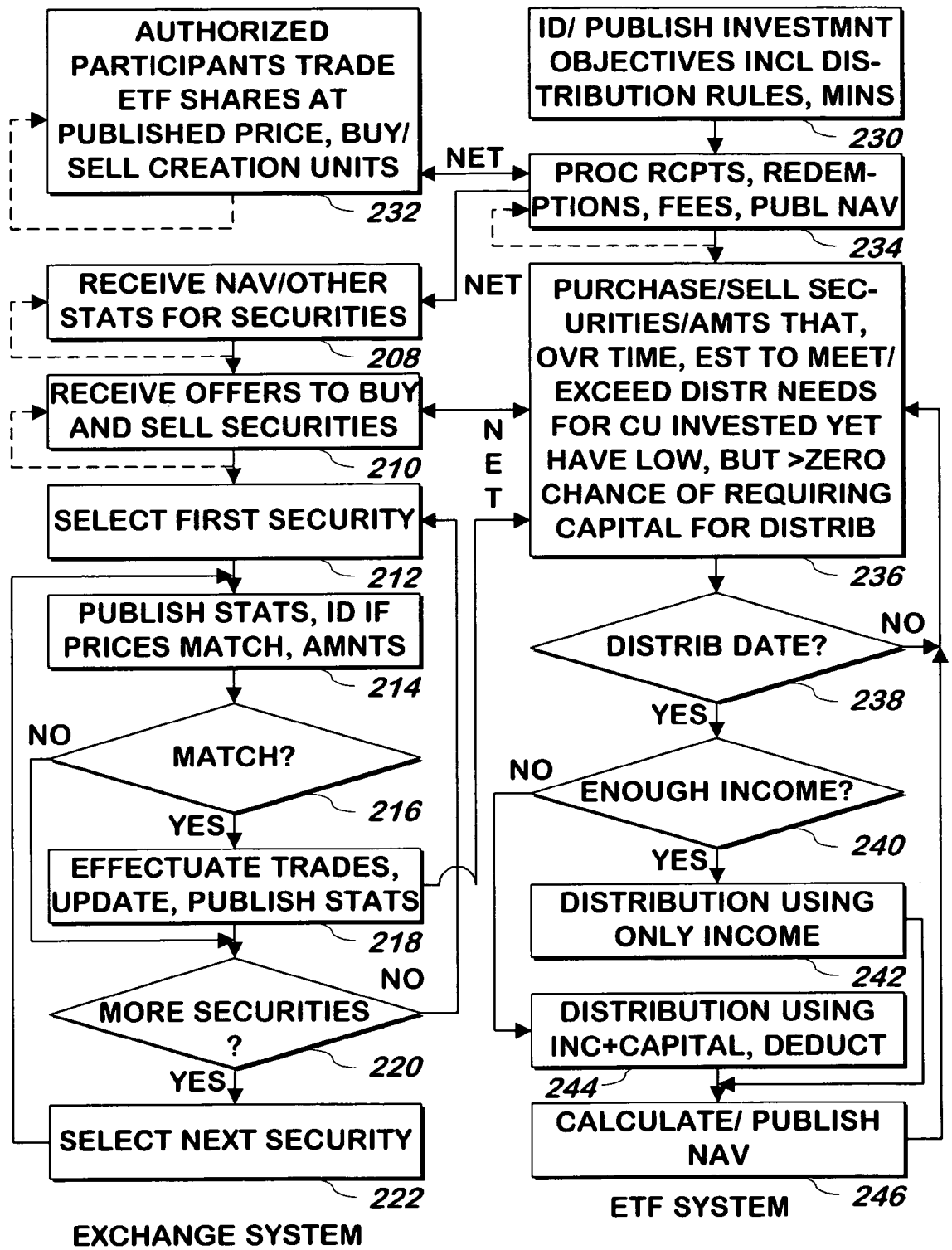
FIG. 2 is a flowchart illustrating a method of conducting transactions of securities, identifying security statistics and managing an exchange traded fund according to one embodiment of the present invention.

FIG. 2 illustrates a method of transacting securities on an exchange, identifying statistics regarding the purchase and sale of securities, including an exchange traded fund and securities used in an exchange traded fund, and operating an exchange traded fund according to one embodiment of the present invention.

Operation of an Exchange To Buy and Sell Securities, Publish Statistics and Publish NAVs of ETFs.

Referring now to FIG. 2, statistics for each of many different securities, such as Net Asset Values (NAVs) of Exchange Traded Funds (ETFs) are received 208, for example from the managers of various funds. The statistics may be received at one or more second computer systems, for example, a computer system of a conventional exchange, from a first computer system via a network such as the Internet. Step 208 may operate as a continuously running process, receiving statistics at various times in the day, or at the end of every day, or both, as indicated by the dashed line in the Figure. For example, intra-day NAVs of ETFs may be received every 15 seconds and NAVs of ETFs may be received shortly after the close of trading.

Offers to buy or sell securities are received 210. The offers may be received from third computer systems at the second computer systems operated by one or more conventional exchanges, such as the New York Stock Exchange, via a network such as the Internet. Each such offer may be received by the computer system of the exchange or exchanges on which the security may be traded. The receipt of such offers may operate as a continuously operating process as shown by the dashed line in the Figure.

A first security for the exchange is selected 212. Statistics for the selected security, including those received as described above, if any, are published by the computer system of the exchange, via a network such as the Internet, and an attempt is made to identify offers to sell the selected security that match offers to buy the selected security using conventional offer matching techniques 214, subject to any limitations of the offers, such as an expiration date and time or price boundary. The statistics may include the last sale price of the selected security, the number of shares offered at the lowest offer price, the number of shares desired for purchase at the highest purchase price, the most recently received net asset value (NAV) of a fund, and the like.

If a match is made 216, the trade is effectuated 218, including performing conventional bookkeeping techniques to keep track of the transferred ownership of the shares (which may be performed by a service provider, such as Depository Trust Corporation), the statistics described above are updated to reflect any trade and the updated statistics published, and the method continues at step 220. If there is no match between offers to buy and offers to sell the selected security 216, the method continues at step 220. Some or all of the above actions may be performed for each security.

At step 220, if there are additional securities traded or reported by the exchange (or securities reported by the exchange), the next security is selected 222 and the method continues at step 214 using the newly selected security, and otherwise 220, the method continues at step 212.

Steps 208-222 may be performed at the computer systems of each of several exchanges, and the securities of the ETF may be traded on one, two or more such exchanges.

Operation of the ETF.

Management and operation of an exchange traded fund ("ETF") is now described.

The manager of the ETF determines and publishes 230 the investment objectives of the ETF. In one embodiment, the investment objectives include certain distribution rules of the ETF as described in more detail below, though in another embodiment, the distribution rules are published separately from the investment objectives. A distribution is an amount of money, expressed as a percentage of the price per share or the NAV per share; or expressed as a fixed amount per share, that will be paid to the investors of the ETF by the ETF or on its behalf.

The distribution rules may include a fixed or minimum distribution from the ETF assets and a distribution schedule, such as four identified days per year. In one embodiment, the fixed or minimum distribution will first be paid from the income of the ETF's assets (including income paid by the securities held by the ETF), and then from the ETF's assets themselves as described in more detail below. Thus, if the ETF's income is insufficient to meet the minimum distribution, then proceeds from the partial sale (or entire sale) of the ETF's assets will be used to meet the minimum distribution.

In one embodiment, the distribution is a function of income of the ETF or another entity, but the minimum distribution may be a fixed amount per share, percentage of the net asset value or a different amount. For example, the distribution may be the entire income of the ETF, and the minimum distribution may be $2 per ETF share, allowing the ETF to distribute all of its income subject to a $2 per share floor. Another example of a distribution rule would be 80% of the income of the ETF in the immediately preceding quarter, with the same $2 per ETF share minimum, allowing some, but not all, the income of the ETF to build up over time if it exceeds the floor until a time, for example, the end of the current calendar year, at which time all undistributed income is distributed.

Other arrangements may be used. In one embodiment, the minimum distribution is at least greater than zero for at least one of the distributions, and it may also be greater than zero for all of the distributions. In one embodiment, the minimum distribution is, in fact, the distribution, and so the distribution is never higher than the minimum until the end of the calendar year. Thus, for example, the distribution may be $2 per ETF share per quarter, with the balance distributed at the end of the year with the last quarterly distribution.

In one embodiment, the minimum distribution is calculated as a function of one or more numbers that have nothing to do with the ETF and are therefore independent of it. For example, the distribution or minimum distribution or both may be based on an index or another metric (e.g. LIBOR or a measure of CPI), so that if the index declines, the distribution or minimum distribution gets larger or vice versa, allowing investors to hedge the index or other metric using the ETF, yet the ETF may have less than all, or none, of its assets invested in that index.

Sale and Redemption of the Creation Units, Including Securities That May be Exchanged for Creation Units.

The manager of the ETF sells and redeems 234 creation units to and from one or more authorized participants, who sell shares in the ETF to, and buy shares in the ETF from, the ETF's investors 232 in the manner of a conventional ETF and who buy and sell creation units from the manager of the ETF, also as part of step 232. The investors may purchase and sell shares in the ETF via one or more exchanges either from an authorized participant or from other shareholders.

The exchange of creation units between the authorized participants and the manager of the ETF may be made in return for cash or securities, or a combination of cash and securities in a conventional manner. For example, to purchase creation units, the authorized participants may provide to the manager of the ETF securities corresponding to a ratio of multiple securities and cash that correspond to a single creation unit as published (e.g. via e-mail or posted on a web site) by the ETF manager from its computer system to the computer system of the authorized participants via a network, multiplied by the number of creation units desired. There may be a transaction or other fee paid to the ETF that the authorized participants pay when selling and/or redeeming creation units.

An initial quantity per creation unit of securities and cash that may be exchanged for a creation unit (and the fee or fees for buying and redeeming a creation unit) may be published by the manager of the ETF as part of step 230 and may include one or more ETFs or indices, which publish their own amounts of securities. The securities that represent one creation unit may thus be a function of the amount of each ETF or index per creation unit that is published by the ETF manager, and the amount of each security in the index published by the owner of the index or ETF. The quantity may be expressed as a fixed amount of securities per creation unit, as a fraction of the value of a creation unit, or as a fraction of the NAV of each ETF share. In the last two cases, the amount of each security transferred during the sale or redemption of a creation unit would then be a function of the value of the creation units, or NAV of the shares, and the number of creation units or shares exchanged. In the case in which the specification is made per share, and creation units are purchased, a conversion for the number of shares per creation unit is also made.

In one embodiment, one or more of the indices may be replaced with a sample of an index, such as the top 200 companies by market capitalization of the S&P 500 index. In one embodiment, an index containing one or more indices and/or securities is created for the purpose of specifying either the securities to provide or a number of shares of that index or ETF to provide for each creation unit purchased or redeemed. There may be one or more such indices created for the ETF.

The types and amounts of securities, indices or ETFs that represent a creation unit may be updated and republished from time to time at step 236, described below, as the ETF is rebalanced as described below or at other times, also as part of step 236. This could mean that the securities and cash received by the ETF manager from an authorized participant when selling a creation unit may be different from the securities and cash the ETF manager provides to the authorized participant when redeeming the same creation unit, even when the fees are removed from each. The sale or redemptions of the creation units may be made using a network such as the Internet via computer systems of the authorized participants and the ETF manager.

The manager of the ETF processes the creations and redemptions of the creation units desired by the authorized participants as part of step 234. As noted, the ETF manager may convert cash to securities when it sells creation units to authorized participants and may convert securities to cash when it redeems creation units for authorized participants.

In one embodiment, the securities so converted are those that may be more efficient for the fund manager to obtain and sell than it is for the authorized participants, for example illiquid securities. In one embodiment, the efficiency of the transfer may be a function of the difficulty of locating or selling the securities, the commissions involved and the tax effects of the conversion.

As noted, securities may be transferred by the ETF manager, to the authorized participants when creation units are redeemed, or from authorized participants when creation units are created. Creations and redemptions of creation units are performed via a network, such as the Internet and may be made via an exchange as described herein.

In one embodiment, the ETF manager not only purchases and sells securities in response to purchases and redemptions of creation units, but also to rebalance the fund to match or maintain the investment objectives in response to fluctuations of the securities relative to one another, for example quarterly, or even daily.

The purchase and sale of securities by the ETF manager or by the authorized participants may take place on any of one or more exchanges as described above via a network and the different computer systems of the exchange, authorized participants and ETF manager.

Identification of the NAV and Intra-Day NAV.

The NAV and intra-day NAV of the ETF shares sold and purchased is determined using the value of the capital assets in the fund, and published, for example, via a network such as the Internet to one or more exchanges and data providers as part of step 234. Publication of the NAV may be made at the end of each day and publication of the intra-day NAV may be performed every 15 seconds throughout the trading day. The NAV may be the sum total of all of the assets of the ETF including capital assets and retained income, divided by the number of shares outstanding. Thus, the NAV is expressed as a price per ETF share. The publication of the NAV may be performed to one or more exchanges via a network such as the Internet as described herein. Prices of the assets that make up the ETF are identified and published by the computer systems of the exchanges as described above, received via a network by the ETF manager and its service providers, used to calculate the NAV by the computer systems of the ETF manager or its service providers, and the NAV is published via a network by the computer systems of the ETF manager (and/or its service providers) to the exchanges' computer systems for publication. The exchanges operate as described above and herein in publishing the NAV of the funds they receive.

In one embodiment, the NAV and intra-day NAV is received by one or more exchanges and other service providers and published with other information for the fund to which the NAV corresponds as described above and herein. However, an authorized participant may receive or provide a different price from or to an investor when selling or buying shares in the ETF.

Securities Held By the ETF Manager; Rebalancing.

In one embodiment, the securities held by the ETF (including those it receives from the authorized participants and those it purchases and sells using cash as described herein) are, in total, those that are expected to generate income that will meet or exceed the minimum distribution over a long period of time (i.e. two or three or four or more periods corresponding the time between distributions), but the securities may not provide such income during a period of time corresponding to any single distribution, or even multiple successive or non-successive distributions. The ETF manager identifies the amounts of securities it will hold (e.g. expressed as a number per share or per creation unit or percentage) and publishes the amounts of securities (which may be expressed as an amount of an index) or types of securities at steps 230, 234 and/or 236. For example, the manager may determine that it will hold 50% of assets in a first index or ETF and 50% in a second index or ETF, and may publish these amounts and the names of the two indices or ETFs at step 230. In one embodiment, an index is created that contains the identified amounts of securities (which may be specified as indices), so that a single index may be specified by the manager of the ETF. The percentage amounts specified or held by the index or indices may be unchanged or may be changed at different times at steps 234 and/or 236.

In this manner, the ETF manager can determine the securities to hold in an attempt to obtain income that will beat the minimum distribution over a long period of time, while recognizing that the risk of not obtaining income that at least meets the minimum distribution (and thereby requiring the minimum distribution to be met using the capital of the ETF) is greater than zero between any two points in time, such as the start of the ETF and a current date, the start of the calendar year and the current date, the most recent distribution date and the current date, the current date and the next distribution date, another date and the current date, or any other pair of dates.

In one embodiment, the ETF is passively managed, in which case the selection of securities that make up the ETF may be made initially, and not changed, or changed only infrequently. The total amounts of the various securities held by the ETF may be changed in a rebalancing process at certain times, for example, quarterly, in order to maintain the relative values of the securities that make up the ETF at a fixed ratio relative to the total value of all securities held by the ETF. The manager of the ETF rebalances the ETF assets at such time to cause the assets of the ETF to reflect the currently applicable ratios of values of securities or types of securities to the total amount of securities held by the ETF. In another embodiment, the ETF is actively managed and the ETF manager may buy or sell securities in an attempt to have the highest income consistent with the investment objectives of the fund (which may be fixed or may change occasionally).

Distributions.

Step 236 may include obtaining the current date and determining whether a sufficient income has been earned to make any minimum distribution due. If the current date is equal to the next distribution date 238 and sufficient income has been made to allow at least the minimum distribution to be made without using the capital of the ETF 240, the distribution is made using the income according to the distribution rules as described above, and the ETF capital will not be reduced 242. In one embodiment, any distribution above the minimum distribution is only made if it can be made solely from the income of the ETF, either since the last distribution or a prior time.

In one embodiment, the distribution rules require any income above the minimum distribution to first be applied to replenish capital that was used to make an earlier distribution and will only be distributed once the capital of the ETF has been replenished. In another embodiment, a fraction (e.g. 20%) of the distribution above the minimum is applied to replenish capital and the rest may be distributed. In still another embodiment, the fraction used starts at a high level following a distribution that uses capital, but the fraction declines over time. In one embodiment, income may only be used to replenish distributions that exceeded retained earnings in a prior part of the same calendar year in which the income was received. That is, the excess of income above the minimum distribution, or some fraction thereof, may only be used to replenish capital that had been distributed in the same calendar year as the year in which the amount of income above the minimum distribution was earned. In such embodiment, the distribution rules may require that all or nearly all earnings are distributed in the same calendar year as they are earned.

In one embodiment, the capital of the ETF does not include income from assets held by the ETF, but does include an increase in value of the assets held by the ETF. For example, dividends and interest are income and thus, will be excluded from capital (unless used to replenish capital as described above as an optional feature), but a share of stock that increases in value increases the capital of the ETF.

If the current date is equal to the next distribution date 238 and sufficient income has not been made to allow at least the minimum distribution to be made without using the capital of the ETF 240, the distribution is made first from any income, and then from the capital, according to the distribution rules 244, for example, in order to meet the minimum distribution. In the event that such capital is required, in one embodiment, if sufficient cash is not held, securities corresponding to the capital required to meet the minimum distribution are sold by the manager of the ETF and used for the distribution.

In one embodiment, such securities are sold that will meet the cash required to perform the minimum distribution, but with a preference for selling securities that represent a higher proportion of the total value of the fund than the then currently applicable percentage target for the fund for those securities, thus rebalancing the fund, at least in part, when selling capital assets to meet the minimum distribution. In the embodiment in which undistributed income is used to replenish the capital, the assets purchased using the earnings are those that are underrepresented with respect to the total value of the ETF compared to the percentages specified at step 230 as described above. Thus, the fund will be rebalanced, or will trend towards being rebalanced, at any time some of the capital of the fund is sold to meet the minimum distribution. In one embodiment, shares sold are those with the highest cost basis. In one embodiment, the cost basis is received from the authorized participant at the time the securities are transferred or identified at the time of purchase (for securities purchased) by the ETF. The cost basis may be recorded by the authorized participant when shares are received either from the ETF or from other sources using conventional techniques and such information is made available at the time the securities are transferred to the ETF.

In one embodiment, the distribution is made by the ETF or on its behalf directly to the holders of the shares of the ETF. In such embodiment, the ETF may query the one or more exchanges on which shares of the ETF are traded or its service providers (e.g. Depository Trust Company) for the ownership records of the holders of the ETF shares to allow distributions to be made directly to the shareholders of the ETF in proportion to the number of ETF shares held as part of step 232.

The NAV of the ETF is updated and published by the fund manager or its service providers, for example to reflect the reduction in capital and/or undistributed assets due to its use for the distribution 246 as described above. The method continues at step 236.

In one embodiment, if future earnings may be used to replenish capital, the value of the amount of earnings that could be potentially used to replenish the capital may also be published. For example, the distribution rules may specify that a first 50% of the income above the minimum distribution will be used to replenish capital that was sold to meet a prior minimum distribution in the same calendar year.

If the minimum distribution may be made without using the capital of the ETF 240, the distribution is made using funds of the ETF other than the capital of the ETF 242, for example, using only the income of the ETF that have been retained and not distributed since the start of the calendar year, or on a different date, and the method continues at step 246. As noted above, the NAV is updated to reflect any distribution as part of step 246.

System.

Figure 3:
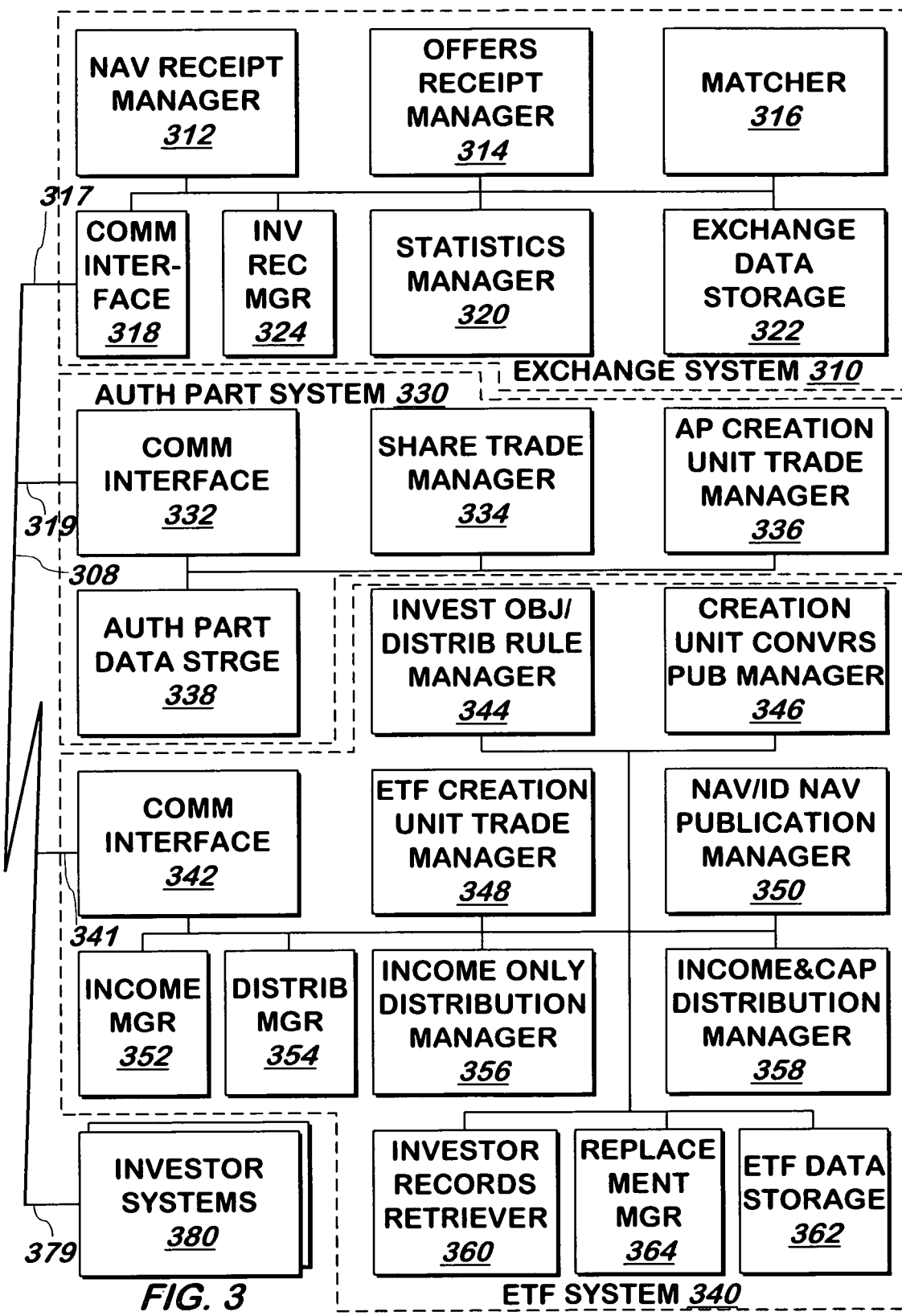
FIG. 3 is a block schematic diagram of a system for conducting transactions of securities, identifying security statistics and managing an exchange traded fund according to one embodiment of the present invention.

Referring now to FIG. 3 a system for conducting transactions of securities, identifying security statistics and managing an exchange traded fund is shown according to one embodiment of the present invention.

The system of FIG. 3 has four components: one or more exchange system such as exchange system 310, one or more authorized participant systems such as authorized participant system 330, an ETF system 340 and multiple investor systems 380, each of which may include a conventional computer system. Each of the above systems 310, 330, 340, 380 includes a communication interface 318, 332, 342 (and not shown in the investor systems 380) including a conventional Ethernet interface running suitable communications protocols such as Ethernet and TCP/IP, each coupled via an input/output 317, 319, 341 and 379 to network 308, which may include one or more conventional Ethernet networks and the Internet. The communication interface in the investor systems 380 additionally has conventional keyboard, mouse and monitor interfaces coupled to conventional keyboard, pointing, and monitor devices, also not shown. Unless otherwise specified, all input and output of the systems 310, 330, 340, 380 is via its respective communication interface 318, 332, 342 (and the communication interface of each of investor systems 380).

Exchange System.

Exchange system 310 may be operated by or on behalf of a conventional security exchange, such as a conventional stock exchange. NAV receipt manager 312 receives one or more NAVs, such as the end of day NAV and intra-day NAVs and optionally other statistics and information for one or more securities, such as one or more Exchange Traded Funds (ETFs) along with an identifier (such as the ticker symbol) of the security for which the NAV and optionally other statistics or information are received as described above. NAV receipt manager 312 timestamps with the current date and time and stores the received information into exchange data storage, which may include conventional memory and/or disk storage, and may include a conventional database. Such information may be received and stored at any time.

Offers receipt manager 314 receives offers to buy and/or sell securities (including ETFs, securities that are held by ETFs and other securities) as described above and timestamps and stores such offers into exchange data storage 322, along with a unique identifier it assigns. Matcher 316 selects each of the securities for which unmatched and currently outstanding offers to buy or sell securities exist in exchange data storage 322 and attempts to match them using conventional securities exchange matching techniques, for example by locating offers to sell a security at a price that is lower than or equal to any offers to buy that security, or offers to buy or sell at the market price with an offer to do the opposite at the market price, or vice versa. For each such match it makes, matcher 316 marks in exchange data storage 322 the offers (or splits the offer to the extent it is matched, assigns a unique identifier to the unmatched portion and marks the matched portion) as being matched, along with the data and time or the match, and adds in exchange data storage 322 the unique identifier or identifiers of each offer matched to any offer. Matcher 316 then initiates the settlement of the trade using conventional techniques, including informing investor records manager 324 of the parties to the trade (with identifiers of the shares actually traded being provided to investor records manager 324 at or around the time or settlement), which investor records manager 324 internally stores, along with the dates of the trade. Investor records manager may be operated by the exchange or its service providers, such as the depository trust corporation. Each time a match is made, matcher 316 signals statistics manager 320 with the identifier of the security matched.

When signaled, statistics manager 320 uses the information in exchange storage 322 to publish statistics and other information described above regarding the securities having the identifiers received from matcher 316, and occasionally selects securities for which no match has been made for a threshold amount of time since the last time it published statistics for such security. Statistics may include statistics regarding matches made as described above (e.g. the number of shares at the offer and bid prices and may include the NAV or intra-day NAV for each security whose identifier is received.

In one embodiment, each offer is received by offers receipt manager 314 with identity information of the entity on whose behalf the offer was made to allow exchange system to track ownership of the securities that are purchased. In such embodiment, offers receipt manager 314 stores such information in exchange data storage 322 associated with the offer. If a trade occurs, matcher 316 provides such information to investor records manager 324. In another embodiment, such information is received by investor records manager 324 at the time of settlement, which is initiated by matcher 316 using conventional techniques. As noted above, investor records manager 324 maintains internally (or in exchange data storage 322) information as to the ownership of each share purchased using the identity information it receives at the time of settlement or otherwise. Such identity information may include an identifier of a financial institution and an account number of the owners of the shares of any matched offer, or a name and address or both.

Authorized Participant System.

Authorized participant system 330 is now described. Share trade manager 334 monitors the statistics provided by statistics manager 320, and as the price of the ETF shares drops below a threshold amount or percentage relative to the NAV or intra-day NAV of the ETF, share trade manager 334 purchases shares in the ETF via exchange system 310 as described above to be redeemed as described below. If the ETF shares trade above the threshold, share trade manager 334 sells any shares it purchased and may purchase additional ETF shares by purchasing one or more creation units. To obtain such additional ETF shares, share trade manager 334 signals authorized participant creation unit trade manager 336, which purchases a creation unit and indicates the number of shares represented by the creation unit purchased. Share trade manager 334 adds the shares to the pool of shares it has available to sell that share trade manager 334 maintains in authorized participant date storage 338.

If the number of shares purchased and held by the authorized participant system rises a threshold amount or percentage above the amount of shares represented by a creation unit, share trade manager 334 signals authorized participant creation unit trade manager 336, which redeems the shares from the pool represented by a creation unit with the ETF system as described herein and signals share trade manager 334 to retire the shares, and share trade manager 334 complies.

An administrator may also indicate to share trade manager 334 to buy or sell shares in the same manner as is described here in, on behalf of a client, and share trade manager 334 purchases or sells shares on behalf of the client. Such shares may be provided from any shares the authorized participant has to sell, but shares acquired for a client are not added to the pool. Authorized participant creation unit trade manager 336 receives instructions from share trade manager 334 to purchase creation units or redeem shares represented by one or more creation units as described in more detail below. As such instructions are received, authorized participant creation unit trade manager 336 purchases or redeems the one or more creation units indicated by share trade manager 334 via ETF system 340 as described in more detail below.

As authorized participant creation unit trade manager 336 buys and redeems shares corresponding to creation units, it maintains records of such purchases in authorized participant data storage 338 using conventional techniques. As share trade manager 334 buys, sells, redeems shares and converts creation units purchased into shares, it maintains records of such activities in authorized participant data storage 338. Authorized participant data storage 338 may contain conventional memory and/or disk storage, and may contain a conventional database.

In one embodiment, the purchase and sale of creation units is in exchange for securities and optionally, some cash as described above. To purchase a creation unit, authorized participant creation unit trade manager 336 first checks the amount and type of securities and optionally cash required to purchase a creation unit that it has received or retrieved from creation unit conversion publication manager 346 described in more detail below. Authorized participant creation unit trade manager 336 checks the amount of securities it is holding that it maintains in authorized participant data storage 338 and purchases any of the securities it does not already have in sufficient amounts via exchange system 310 or another system.

As creation units are redeemed, authorized participant creation unit trade manager 336 receives the securities, and optionally cash, represented by the creation unit or units redeemed, which authorized participant creation unit trade manager 336 maintains in authorized participant data storage 338. Such securities may be received from other sources and the amounts and serial numbers of the share certificates may be stored in authorized participant data storage 338 by authorized participant creation unit trade manager 336 or such other sources, which may also sell such securities. The exchange of the securities between authorized participant creation unit trade manager 336 and the ETF system may be performed via exchange system 310 or via the National Securities Clearing Corporation, or other similar clearing facility.

ETF System.

ETF system 340 is now described. Investment objective/distribution rule publication manager 344 receives from a fund manager or other person a description of the investment objective for the ETF and distribution rules for the ETF as described above and stores such information in ETF data storage 362. ETF data storage 362 may include conventional memory or disk storage and may contain a conventional database. When an investor or other party wishes to view the investment objectives, distribution rules or both, it requests them from investment objective/distribution rule manager 344, which provides either or both of them. Investment objective/distribution rule manager 344 may distribute such information to parties who have registered to receive it, either when such information is initially received, if it changes, periodically or at other times. In one embodiment, the distribution rules may include dates of distributions, the dates on or near which investors of record in the ETF at such date will receive a distribution according to the distribution rules and formulas for calculating minimum distributions and other distributions are described herein.

Creation unit conversion publication manager 346 receives from the ETF manager or other party, identifiers and amounts of securities that are used to trade for one creation unit and any fees. Creation unit publication manager 346 timestamps and stores such information in ETF data storage 362 and provides such information to the authorized participant systems 330 upon request as described above or distributes such information or both.

ETF creation unit trade manager 348 sells and redeems shares in the ETF represented by creation units with one or more authorized participant systems 330 as described above. ETF creation unit trade manager 348 receives from an authorized participant system 330 identifiers of shares of the ETF represented by a creation unit to be redeemed, or an amount of a set of securities and/or cash, from the authorized participant system 330 or on behalf of such system, and optionally provides an identifier of each share represented by the creation units purchased for the amount of cash and/or securities received in the then applicable amounts specified in ETF data storage 362 as described above, or provides the then applicable amount of the securities and/or cash representing a creation unit specified in ETF data storage 362, for the ETF shares representing each creation unit redeemed. As creation units are sold or redeemed in this manner, In one embodiment, the trades between the authorized participant systems 330 described above and ETF system 340 that are exclusive of cash are made via a clearing facility, such as the National Securities Clearing Corporation, NSCC. Cash may be transferred via conventional wire transfer or other similar techniques.

In one embodiment, the shares of securities provided to the authorized participant system 330 when redeeming shares representing a creation unit are those with the lowest cost basis.

In one embodiment, when cash is received, ETF creation unit trade manager 348 so indicates to a system administrator, who purchases the securities purchased by the ETF as described above. When shares representing a creation unit are redeemed, ETF creation unit trade manager 348 indicates to the system administrator, who initiates the sale (which is completed using conventional techniques) of the securities that are purchased and sold by the ETF when cash is received as described above. In another embodiment, the system administrator indicates to ETF creation unit trade manager the securities that should be purchased when cash is received and in what proportion, and ETF creation unit trade manager 348 purchases such shares via exchange system 310 or another facility such as NSCC. In this embodiment, when shares representing one or more creation units are redeemed, ETF creation unit trade manager 348 sells the securities so indicated, either as the source of the cash provide to the authorized participant system or to replenish a cash supply used for such redemptions.

In one embodiment, ETF creation unit trade manager 348 maintains in ETF data storage 362 the number of shares represented by the creation units issued, less any shares redeemed as described above. This number of shares is referred to as the number of ETF shares outstanding.

NAV/Intra-day NAV publication manager 350 periodically receives or retrieves the statistics from statistics manager 320 for the securities and cash that make up one creation unit as stored in ETF data storage 362. NAV/Intra-day NAV publication manager 350 sums the market prices of the specified amounts of such securities that make up a creation unit and are stored in ETF data storage 262, adds the amount of cash required per creation unit, divides the total by the number of shares represented by each creation unit and publishes the result as the Intra-day NAV. The publication is performed approximately once every 15 seconds throughout each day that the ETF shares are traded. When the market has closed for all securities specified, NAV/Intra-day NAV publication manager 350 publishes the result described above as the NAV for the ETF.

In one embodiment, the information regarding the securities that make up the ETF are supplied on a per share basis. In that circumstance, the calculations described herein are adjusted accordingly, e.g. by NAV/Intra-day NAV publication manager 350 not making the division described above, and by ETF creation unit trade manager 348 multiplying the amounts described above by the number of shares per creation unit.

Income manager 352 receives notices of income posted to the ETF from its investments in securities that are received or purchased as described herein, or both. Notices of income may be received from a system administrator, who manually enters them, or they may be automatically received, for example via an exchange or a party related to the security for which the income is received. The income itself may be deposited into one or more accounts set up for this purpose. Income manager 352 timestamps and stores into ETF data storage 362 the amount of the income.

Distribution manager 354 checks the date after the close of market trading and determines whether the current date is equal to one of the distribution dates as specified by the distribution rules stored in ETF data storage 362. If the current date is not a distribution date, distribution manager 354 sets a timer with an operating system (not shown) to repeat the process the next day, at the next distribution date, or at another time in the future. If the date is a distribution date, distribution manager 354 sets the timer as described above, signals investor records retriever 360, identifies the applicable distribution using the distribution rules stored in ETF data storage 362 as described above, and the income received in the calendar year and/or other periods applicable to the rule as such income is stored in ETF data storage 362, and determines if the income received but not distributed is sufficient to meet the minimum distribution for that distribution date (or for all distribution dates) using the income for the calendar year of the distribution date divided by the number of ETF shares outstanding, such income and number of shares being stored in ETF data storage 326, and any distributions made in the calendar year of the distribution date, such distributions being stored in ETF data storage 362 as described below. If the income is sufficient, distribution manager 354 provides the date and the amount of the distribution per share to income only distribution manager 356. If the income is not sufficient, distribution manager 354 provides the current date and the amount of the distribution and the total amount of the capital to be sold to income and capital distribution manager 358. As noted, any amount of the distribution provided to income and capital distribution manager 358 will be the minimum distribution in one embodiment. Distribution manager 354 stores into ETF data storage the amount of the distribution and optionally the per share amount of the capital to be sold that it identifies, and the date, for potential use in subsequent distribution calculations.

When signaled, investor records retriever 360 requests investor information from investor records manager 324 of exchange system 310 (which may actually be operated by a service provider of the Exchange or other party, such as Depository Trust Corporation) by providing the ticker symbol of the ETF, and the current date and time. Investor records manager 324 retrieves and provides to investor records retriever 360 information regarding the current investors of record of the ETF. Such information may include an account number and identifier of a financial institution or name and address that was supplied with an offer to purchase shares in the ETF the investor made as described above, that may have been supplied with at time of settlement as described above. Investor records retriever 360 stores such information into ETF data storage 362 along with the date.

When it receives the date and amount, income only distribution manager 356 identifies the number of shares held by each ETF shareholder on such date as stored in ETF data storage 362 and initiates the transfer of the per share distribution multiplied by the number of shares each such ETF shareholder owns. This transfer is made from an account of the ETF used for such purpose to the ETF shareholder's account or initiates the sending of a check to the shareholder if no account is supplied, using the identity information stored in ETF data storage 362.

When it receives the date and amounts, income and capital distribution manager 358 initiates the sale of the capital of the ETF as described above (which is completed using conventional techniques), and identifies the number of shares held by each ETF shareholder on such date as stored in ETF data storage 362 and initiates the transfer of the per share distribution multiplied by the number of shares each such ETF shareholder owns from an account used for such purpose to the ETF shareholder's account or initiates the sending of a check to the shareholder if no account is supplied, using the identity information stored in ETF data storage 362.

In one embodiment, when income and capital distribution manager 358 initiates the sale of capital, it stores in ETF data storage 362 the amount and type of capital sold. If, at a time an amount of a later distribution is identified, the income is in excess of the minimum distribution, distribution manager 354 uses such information in ETF data storage 362 to identify an amount of income used to replace capital that had previously been sold to meet a minimum distribution in a prior period, if any, in accordance with the distribution rules, and provides such amount to replenishment manager 364, which may use the amount and type of capital sold to purchase some or all of the assets that had been sold or different assets up to the amount it receives. Such assets are then considered capital of the ETF for future calculations. As it purchases capital assets, replenishment manager 364 stores in ETF data storage 362 the amount and type of assets used to replenish capital, which distribution manager 358, replenishment manager 364 or both, may use to determine the amount and type of securities to purchase to replenish capital.

What is claimed is:

1. A computer program product comprising a computer useable medium having computer readable program code embodied therein for managing an exchange traded fund, the computer program product comprising computer readable program code devices configured to cause a computer system to:

at a first computer system, determine whether income from securities comprising capital assets of the exchange traded fund that may be used to pay distributions to shareholders of the exchange traded fund, at least some of said capital assets having a value that is stated by the exchange traded fund as being available to be traded to pay distributions of the exchange traded fund, the exchange traded fund having shares traded on an exchange at a second computer system coupled to the first computer system via a network, are sufficient to supply funds for a distribution to be made to shareholders of the exchange traded fund, at least some of whom purchased shares in the exchange traded fund at the second computer system, at least some of said shares having been sold by an authorized participant; and responsive to the determination that income from the capital assets of the fund are not sufficient to supply funds for the distribution, provide the distribution to shareholders of the ETF, the distribution being provided at least in part by obtaining cash for the value of securities comprising at least some of the capital assets of the exchange traded fund that were used to calculate a net asset value of the exchange traded fund.

2. The computer program product of claim 1, additionally comprising computer readable program code devices configured to cause the computer system to, responsive to the determination that income is sufficient to supply funds for the distribution, provide the distribution to shareholders of the exchange traded fund from the income of the exchange traded fund.

3. The computer program product of claim 1:
additionally comprising computer readable program code devices configured to cause the computer system to provide at least one distribution rule specifying a minimum distribution to be provided to the shareholders responsive to the determination that the income is not sufficient to supply funds for the distribution; and
wherein the distribution is provided in compliance with the at least one distribution rule.

4. The computer program product of claim 3, wherein the capital assets of exchange traded fund comprise securities that are anticipated to provide to the exchange traded fund, income greater than the minimum distribution over a period of time.

5. The computer program product of claim 3, wherein the at least one distribution rule is responsive to a condition that is substantially independent of the income of the exchange traded fund.

6. The computer program product of claim 3, wherein the at least one distribution rule is based at least in part on the income of the exchange traded fund.

7. The computer program product of claim 1, additionally comprising computer readable program code devices configured to cause the computer system to replenish at least some of the capital assets of the exchange traded fund, using at least some of the income of the exchange traded fund that is received in a period subsequent to a period for which the amount of income of the exchange traded fund was not sufficient to supply funds for the one of the plurality of distributions to be made to shareholders of the exchange traded fund.

* * * * *